United States Patent
Hara

(10) Patent No.: US 7,885,437 B2
(45) Date of Patent: Feb. 8, 2011

(54) FINGERPRINT COLLATION APPARATUS, FINGERPRINT PATTERN AREA EXTRACTING APPARATUS AND QUALITY JUDGING APPARATUS, AND METHOD AND PROGRAM OF THE SAME

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 1017 days.

(21) Appl. No.: 11/679,421

(22) Filed: Feb. 27, 2007

(65) Prior Publication Data

US 2007/0201733 A1  Aug. 30, 2007

(30) Foreign Application Priority Data

Feb. 27, 2006  (JP) .............................. 2006-050391

(51) Int. Cl.
*G06K 9/00* (2006.01)
*G06K 9/46* (2006.01)

(52) U.S. Cl. ...................... 382/125; 382/115; 382/124; 382/190; 382/197; 382/203

(58) Field of Classification Search ................ 382/125, 382/124, 197, 203, 115, 190
See application file for complete search history.

(56) References Cited

U.S. PATENT DOCUMENTS

| | | | | |
|---|---|---|---|---|
| 4,047,154 A | | 9/1977 | Vitols et al. | |
| 4,156,230 A | * | 5/1979 | Riganati et al. | 382/124 |
| 4,953,228 A | * | 8/1990 | Shigemitsu et al. | 382/125 |
| 5,040,224 A | * | 8/1991 | Hara | 382/124 |
| 5,177,792 A | * | 1/1993 | Morita | 382/125 |
| 5,420,937 A | * | 5/1995 | Davis | 382/125 |
| 5,497,429 A | * | 3/1996 | Shibuya | 382/125 |
| 5,519,785 A | * | 5/1996 | Hara | 382/124 |
| 5,703,958 A | * | 12/1997 | Hara | 382/124 |
| 5,796,857 A | * | 8/1998 | Hara | 382/124 |
| 5,848,176 A | * | 12/1998 | Hara et al. | 382/124 |
| 5,963,656 A | | 10/1999 | Bolle et al. | |
| 6,002,784 A | * | 12/1999 | Sato | 382/124 |
| 6,005,963 A | * | 12/1999 | Bolle et al. | 382/124 |
| 6,243,492 B1 | * | 6/2001 | Kamei | 382/181 |
| 6,282,302 B1 | * | 8/2001 | Hara | 382/116 |
| 6,961,453 B2 | * | 11/2005 | Yoon et al. | 382/125 |
| 7,068,824 B2 | * | 6/2006 | Hara et al. | 382/125 |

(Continued)

FOREIGN PATENT DOCUMENTS

JP   52-097298 A   8/1977

(Continued)

*Primary Examiner*—Bhavesh M Mehta
*Assistant Examiner*—Michael A Newman
(74) *Attorney, Agent, or Firm*—Sughrue Mion, PLLC

(57) ABSTRACT

To enable extraction of a specific area (pattern area) that includes a characteristic part of the inherent pattern of individual fingerprint from an inputted fingerprint image of a human being or other creature. The pattern area is extracted as the minimum area that is surrounded by a right pattern area slope, a left pattern area slope, and pattern area bases. The right (left) pattern area slope is a fingerprint ridge which runs towards the outside on the right (left) side from the start point that is located on the upper side of the center point of the fingerprint image, and satisfies a prescribed condition. The pattern area base is a fingerprint ridge which runs on the lower side of the center and satisfies a prescribed condition.

6 Claims, 16 Drawing Sheets

U.S. PATENT DOCUMENTS

| | | | |
|---|---|---|---|
| 2003/0103659 A1* | 6/2003 | Hara et al. | 382/125 |
| 2004/0101173 A1* | 5/2004 | Hara et al. | 382/124 |
| 2005/0084155 A1* | 4/2005 | Yumoto et al. | 382/190 |

FOREIGN PATENT DOCUMENTS

| | | | |
|---|---|---|---|
| JP | 59-27945 B2 | 7/1984 |
| JP | 1-271884 A | 10/1989 |
| JP | 02-196380 A | 8/1990 |
| JP | 08-279039 A | 10/1996 |
| JP | 08-287259 A | 11/1996 |
| JP | 2637764 B2 | 4/1997 |
| JP | 2690103 B2 | 8/1997 |
| JP | 2002-032757 A | 1/2002 |
| JP | 2002-288641 A | 10/2002 |
| JP | 2003-337949 A | 11/2003 |

* cited by examiner

NO PATTERN AREA

WITH PATTERN AREA

NO PATTERN AREA

WITH PATTERN AREA

PATTERN AREA COMPLETE IMPRESSION

PATTERN AREA PARTIAL IMPRESSION

PATTERN AREA COMPLETE IMPRESSION

PATTERN AREA PARTIAL IMPRESSION

PATTERN AREA IS INCOMPLETE

PATTERN AREA IS COMPLETE

EXTRACTED PATTERN AREA SLOPE

EXTRACTED PATTERN AREA SLOPE

FINGERPRINT COLLATION APPARATUS, FINGERPRINT PATTERN AREA EXTRACTING APPARATUS AND QUALITY JUDGING APPARATUS, AND METHOD AND PROGRAM OF THE SAME

BACKGROUND OF THE INVENTION

1. Field of the Invention

The present invention relates to an extracting device for extracting a specific area within a fingerprint image that is suitable for fingerprint collation, to an evaluation apparatus for evaluating the quality of the fingerprint image based on the aforementioned area, and to a fingerprint collation apparatus.

2. Description of the Related Art

In general, a fingerprint constituted with a great number of ridgelines in striped patterns has two significant characteristics that it does not change throughout one's life and that no one has the same pattern. Therefore, fingerprints have been used for a long time as a way of verifying individuals.

Recently, various countries such as the United States have started to employ identity confirmation using the fingerprint, as a method for enabling a strict immigration control. Further, fingerprint collation as the identity recognition, which is performed at the time of entering/leaving a gate or at the time of log-in, has also become widespread.

In such operations, it is important to judge the quality of an input fingerprint automatically. If it is possible to judge that the fingerprint quality is bad, the fingerprint can be rejected and re-input can be requested. Thus, it becomes possible to deal with such case operationally.

As a method for judging the quality of the fingerprint image, conventionally, there is a method for judging the quality based on whether the direction of the ridgelines of the fingerprint is detected or not and the reliability of that detection, as disclosed in Japanese Unexamined Patent Publication 2002-32757 (Patent Literature 1) and Japanese Unexamined Patent Publication 2003-337949 (Patent Literature 2). In addition, also widely used is a method which judges the quality by using an area where the ridgeline direction can be recognized, as disclosed in U.S. Pat. No. 5,963,656 (Patent Literature 3).

In the above-described techniques, however, the common area in the two fingerprints to be verified is not considered. Thus, when judged that the similarity therebetween is low because of narrow common area, it is necessary to apply improvements so that the judgment can be executed accurately. For example, two fingerprints shown in FIG. 12A and FIG. 12B are the same fingerprints. The fingertip part above the center point of the fingerprint is impressed in FIG. 12A, whereas the area including the center point of the fingerprint is impressed in FIG. 12B. Since the common areas of the two fingerprints, i.e. the areas that overlap with each other at the center points of the two fingerprints, are narrow, it is highly possible that the collation turns out as a failure. However, looking at the two fingerprints individually, the ridgeline directions of each fingerprint are clear and the impressed areas of the two fingerprints are not narrow. Therefore, with the above-described method, it is possible that the qualities of the both fingerprints are judged as being high qualities. From the view point of judging the degree of the similarity between the fingerprints, this needs to be improved.

In order to guarantee the common areas of the fingerprint images as the collation targets, there is proposed a technique that is disclosed in U.S. Pat. No. 6,005,963 (Patent Literature 4). This technique judges whether or not the fingerprint image is a partial impression and, when it is a partial impression, rejects the collation and encourages a re-input, etc. As a method for judging it as a partial image, this technique judges whether or not a ridge trace line that surrounds the image center is sufficiently extended in a left downward direction and right downward direction. However, even if the method is capable of judging the partial fingerprint that is missing the left area or the right area, it is not capable of judging the partial fingerprint that is missing the top area or the bottom area. Thus, in the case of FIG. 12, it is judged even using this method that both fingerprints are not the partial fingerprints and both are of the high quality. Therefore, the aforementioned issue cannot be overcome with this technique.

Further, in order to perform the fingerprint collation with high accuracy, it is preferable for the common areas of a plurality of fingerprint images as the collation targets to include the part where the features of the fingerprints appear prominently, i.e. the center part of so-called a whorl. Thus, there has been desired a technique for evaluating the fingerprint quality, which is capable of judging the fingerprint image including such part as being a high-quality image.

Meanwhile, the mainstream of the collation of fingerprints is a collation of the minutiae, with which the minutiae of the fingerprints such as the end points or bifurcations of the ridgelines are extracted, and collation is performed by using the minutiae. However, there is a limit in the accuracy of the collation that is performed only with the minutiae. Thus, it has been desired to improve the accuracy of the fingerprint collation by defining a new feature quantity to be used for collation. Further, a collation device by using new data is also desired to take the place of the collation performed by the minutiae of the ridgelines.

The foregoing issues can be overcome if a specific area including a characteristic part of the inherent pattern of individual fingerprint can be extracted from an inputted fingerprint image of a human being or other creature. It is because fingerprint quality judgment and fingerprint collation with high accuracy can be achieved by utilizing information regarding: whether or not extraction can be performed perfectly; degree of extraction such as whether or not the partial extraction is performed; position, range and the like of the extracted area. However, conventionally, there has been no such technique for recognizing and extracting such specific area.

SUMMARY OF THE INVENTION

The present invention has been designed to overcome the aforementioned issues, and the object thereof is to achieve extraction of a specific area that includes a characteristic part of the inherent pattern of individual fingerprint from an inputted fingerprint image of a human being or other creature.

The present invention provides a device for extracting a pattern area of a fingerprint from a fingerprint image as the above-described specific area.

The pattern area means an area where the thick part of a fingertip is impressed, which includes a characteristic part of the inherent pattern of individual fingerprint. The characteristic part in the inherent pattern of the fingerprint is a center part of the fingerprint, which is conventionally referred to as a core. According to a general definition of the core, there is no core in the arch type although there is in the whorl type and the loop type. In the present invention, however, even in the case of the arch type, a characteristic part of a pattern which is considered to be the arch type is referred to as a core, and the part including that area is extracted. The characteristic part of the pattern indicating that it is the arch type is shown in the center part of FIG. 4A.

Further, extraction means to detect the range of the pattern area based on an objective criterion, and output the information indicating the characteristic of the area such as the position and the range.

A first apparatus according to the present invention is a pattern area extraction apparatus which extracts a pattern area from an inputted fingerprint image.

A second apparatus according to the present invention is the first pattern area extraction apparatus which extracts a smallest pattern area from the fingerprint image.

A third apparatus according to the present invention is the second pattern area extraction apparatus, which comprises a pattern area slope extracting device that extracts a lowest pattern area slope from the fingerprint image, and a pattern area acknowledging device that extracts the smallest fingerprint pattern area based on the lowest pattern area slope.

A fourth apparatus according to the present invention is the third pattern area extraction apparatus, wherein the pattern area slope extracting device comprises: a right pattern area slope extracting device that extracts a first right pattern slope by searching right pattern area slopes towards an upper direction from a center point of the fingerprint image; and a left pattern area slope extracting device that extracts a first left pattern slope by searching left pattern area slopes towards the upper direction from the center point of the fingerprint image.

A fifth apparatus according to the present invention is the fourth pattern area extraction apparatus, wherein the right (or the left) pattern area slope is a slope among fingerprint ridges that run down towards right (or left) side from a first start point (or a second start point), which has horizontal distance of more than a first prescribed value or more than a second prescribed value from the start point, and ends by curving downwards.

A sixth apparatus according to the present invention is the third pattern area extraction apparatus, wherein the pattern area slope extracting device searches pattern area slopes on right and left sides from an upper part of the fingerprint image towards a lower part at a prescribed interval, and extracts lowest pattern area slopes having a prescribed shape change.

A seventh apparatus according to the present invention is any one of the third to sixth pattern area extraction apparatuses, which further comprises a pattern area feature extracting device that outputs a completeness evaluation value of the extracted pattern area based on whether or not the right pattern slope is extracted and whether or not the left pattern slope is extracted.

An eighth apparatus according to the present invention is any one of the third to seventh pattern area extraction apparatuses, wherein the pattern area feature extracting device calculates a right slope area dimension and a left slope area dimension based on the right and left pattern area slopes, and calculates dimension of the pattern area that includes a total value thereof.

A ninth apparatus according to the present invention is either one of the seventh or eighth pattern area extraction apparatus, wherein the pattern area feature extracting device further outputs a right slope vertex position, a left slope vertex position, a distance between the vertexes of the right and left slopes, height of the right slope vertex, height of the left slope vertex, and angles of the right and left slopes, of the pattern area.

A tenth apparatus according to the present invention is either one of the fourth or fifth pattern area extraction apparatus, which further comprises a pattern area base extracting device that extracts, as pattern area bases from the fingerprint image, highest ridgelines with a curvature of less than a prescribed value, which are extended in right and left sides from a third start point that positioned beneath a center point of the fingerprint image, and a straight line connecting both ends thereof is almost horizontal, wherein the pattern area acknowledging device extracts the fingerprint pattern area based on the pattern area slopes and the pattern area bases.

An eleventh apparatus according to the present invention is the tenth pattern area extraction apparatus, which further comprises a pattern area feature extracting device that outputs a completeness evaluation value of the extracted pattern area based on whether or not the right pattern slope is extracted, whether or not the left pattern slope is extracted, and whether or not the pattern area bases are extracted.

A twelfth apparatus according to the present invention is a quality judging apparatus which evaluates the quality of the fingerprint image based on a pattern area feature quantity that is outputted by any one of the seventh, eighth, ninth, or eleventh fingerprint pattern area extraction apparatus.

A thirteenth apparatus according to the present invention is a quality judging apparatus which evaluates the quality of the fingerprint image based on the completeness evaluation value of the pattern area extracted by the seventh or eleventh fingerprint pattern area extraction apparatus and/or qualities of ridgelines within the pattern area.

A fourteenth apparatus according to the present invention is a fingerprint collation apparatus which performs collation of the fingerprint image based on minutiae of fingerprint ridges within the pattern area extracted by any one of the first to eleventh fingerprint pattern area extraction apparatuses.

A fifteenth apparatus according to the present invention is a fingerprint collation apparatus which performs fingerprint collation by using the pattern area feature quantities outputted from the ninth fingerprint pattern area extraction apparatus for the collation.

A sixteenth apparatus according to the present invention is the first fingerprint pattern area extraction apparatus, which extracts the pattern area by dividing it into a plurality of regions.

A seventeenth apparatus according to the present invention is the first fingerprint pattern area extraction apparatus, which comprises a pattern area slope extracting device that extracts pattern area slopes from the fingerprint image, and a pattern area acknowledging device that extracts the fingerprint pattern area based on the pattern area slopes.

An eighteenth apparatus according to the present invention is a fingerprint collation apparatus which performs fingerprint collation by using the feature quantities of the pattern area extracted by the sixteenth or seventeenth apparatus.

A first program according to the present invention is a program for enabling a computer to execute a function of extracting a pattern area from an inputted fingerprint image.

A second program according to the present invention is the first program, which enables the computer to execute a function of extracting a smallest pattern area from the fingerprint image.

A third program according to the present invention is the second program, which enables the computer to execute: a pattern area slope extracting procedure for extracting lowest pattern area slopes from the fingerprint image; and a pattern area acknowledging procedure for extracting the smallest fingerprint pattern area based on the lowest pattern area slopes.

A fourth program according to the present invention is the third program, wherein the pattern area slope extracting procedure comprises: a right pattern area slope extracting procedure which extracts a first right pattern slope by searching right pattern area slopes towards an upper direction from a center point of the fingerprint image; and a left pattern area slope extracting procedure which extracts a first left pattern slope by searching left pattern area slopes towards the upper direction from the center point of the fingerprint image.

A fifth program according to the present invention is the fourth program, wherein the right (or the left) pattern area slope is a slope among fingerprint ridges that run down towards right (or left) side from a first start point (or a second start point), which has horizontal distance of more than a first prescribed value or more than a second prescribed value from the start point, and ends by curving downwards.

A sixth program according to the present invention is the third program, wherein the pattern area slope extracting procedure searches pattern area slopes on right and left sides from an upper part of the fingerprint image towards a lower part at a prescribed interval, and extracts lowest pattern area slopes having a prescribed shape change.

A seventh program according to the present invention is any one of the third to seventh programs, which further enables the computer to execute the pattern area feature extracting procedure that outputs a completeness evaluation value of the extracted pattern area based on whether or not the right pattern slope is extracted and whether or not the left pattern slope is extracted.

An eighth program according to the present invention is any one of the third to seventh program, wherein the pattern area feature extracting procedure calculates a right slope area dimension and a left slope area dimension based on the right and left pattern area slopes, and calculates dimension of the pattern area that includes a total value thereof.

A ninth program according to the present invention is the one of the seventh or eighth program, wherein the pattern area feature extracting procedure further outputs a right slope vertex position, a left slope vertex position, a distance between the vertexes of the right and left slopes, height of the right slope vertex, height of the left slope vertex, and angles of the right and left slopes, of the pattern area.

A tenth program according to the present invention is one of the fourth or fifth program, which further enables the computer to execute a pattern area base extracting procedure that extracts, as pattern area bases from the fingerprint image, highest ridgelines with a curvature of less than a prescribed value, which are extended in right and left sides from a third start point that positioned beneath a center point of the fingerprint image, and a straight line connecting both ends thereof is almost horizontal, wherein the pattern area acknowledging procedure is a procedure of extracting the fingerprint pattern area based on the pattern area slopes and the pattern area bases.

An eleventh program according to the present invention is the tenth program, which further enables the computer to execute a pattern area feature extracting procedure that outputs a completeness evaluation value of the extracted pattern area based on whether or not the right pattern slope is extracted, whether or not the left pattern slope is extracted, and whether or not the pattern area bases are extracted.

A twelfth program according to the present invention is a program which enables a computer to execute a procedure for evaluating the quality of the fingerprint image based on pattern area feature quantities that are outputted by any one of the seventh, eighth, ninth, or eleventh program.

A thirteenth program according to the present invention is a program which enables a computer to execute a procedure for evaluating the quality of the fingerprint image based on the completeness evaluation value of the pattern area obtained by executing the seventh or eleventh program and/or qualities of ridgelines within the pattern area.

A fourteenth program according to the present invention is a program which enables a computer to execute a procedure for performing collation of the fingerprint image based on minutiae of fingerprint ridges within the pattern area extracted by executing the any of the first to eleventh programs.

A fifteenth program according to the present invention is a program which enables a computer to execute a procedure for performing fingerprint collation by using pattern area feature quantities that are outputted the ninth program.

A sixteenth program according to the present invention is the first program, which enables the computer to execute a procedure for extracting the pattern area by dividing it into a plurality of regions.

A seventeenth program according to the present invention is the first program, which enables the computer to execute: a pattern area slope extracting procedure for extracting pattern area slopes from the fingerprint image; and a pattern area acknowledging procedure for extracting the fingerprint pattern area based on the pattern area slopes.

An eighteenth program according to the present invention is a program which enables a computer to execute a procedure for performing fingerprint collation by using the pattern area feature quantities that are extracted by the sixteenth or seventeenth programs.

A first method according to the present invention is a fingerprint pattern area extraction method, which comprises the steps of: a right pattern area slope extracting step which extracts a first right pattern slope by searching right pattern area slopes towards an upper direction from a center point of the inputted fingerprint image; a left pattern area slope extracting step which extracts a first left pattern slope by searching left pattern area slopes towards the upper direction from the center point of the fingerprint image; and a pattern area acknowledging step which extracts a fingerprint pattern area based on the pattern area slopes.

A second method according to the present invention is the first fingerprint pattern area extraction method, wherein the right (or the left) pattern area slope is a slope among fingerprint ridges that run down towards right (or left) side from a first start point (or a second start point), which has horizontal distance of more than a first prescribed value or a second prescribed value from the start point, and ends by curving downwards.

A third method according to the present invention is the first or the second fingerprint pattern area extraction method, which further comprises a pattern area feature extracting step that outputs a completeness evaluation value of the extracted pattern area based on whether or not the right pattern slope is extracted and whether or not the left pattern slope is extracted.

A fourth method according to the present invention is the third fingerprint pattern area extraction method, wherein, in the pattern area feature extracting step, a right slope area dimension and a left slope area dimension are calculated based on the right and left pattern area slopes, and dimension of the pattern area that includes a total value thereof is calculated.

With the present invention, it is possible to extract the pattern area that is included in a fingerprint image of a hand or foot.

DETAILED DESCRIPTION OF THE PREFERRED EMBODIMENTS

Preferred embodiments of the present invention will be described hereinafter by referring to the accompanying drawings. In the following explanations, the axial direction towards the fingertip from the joint of the finger is called the Y-axis direction or vertical direction. In the Y-axis direction, the fingertip side is the upper direction. The direction orthogonal to the Y-axis direction is called the X-axis direction or horizontal direction.

1. First Embodiment (1) Overall Structure and Outline

Figure 11:
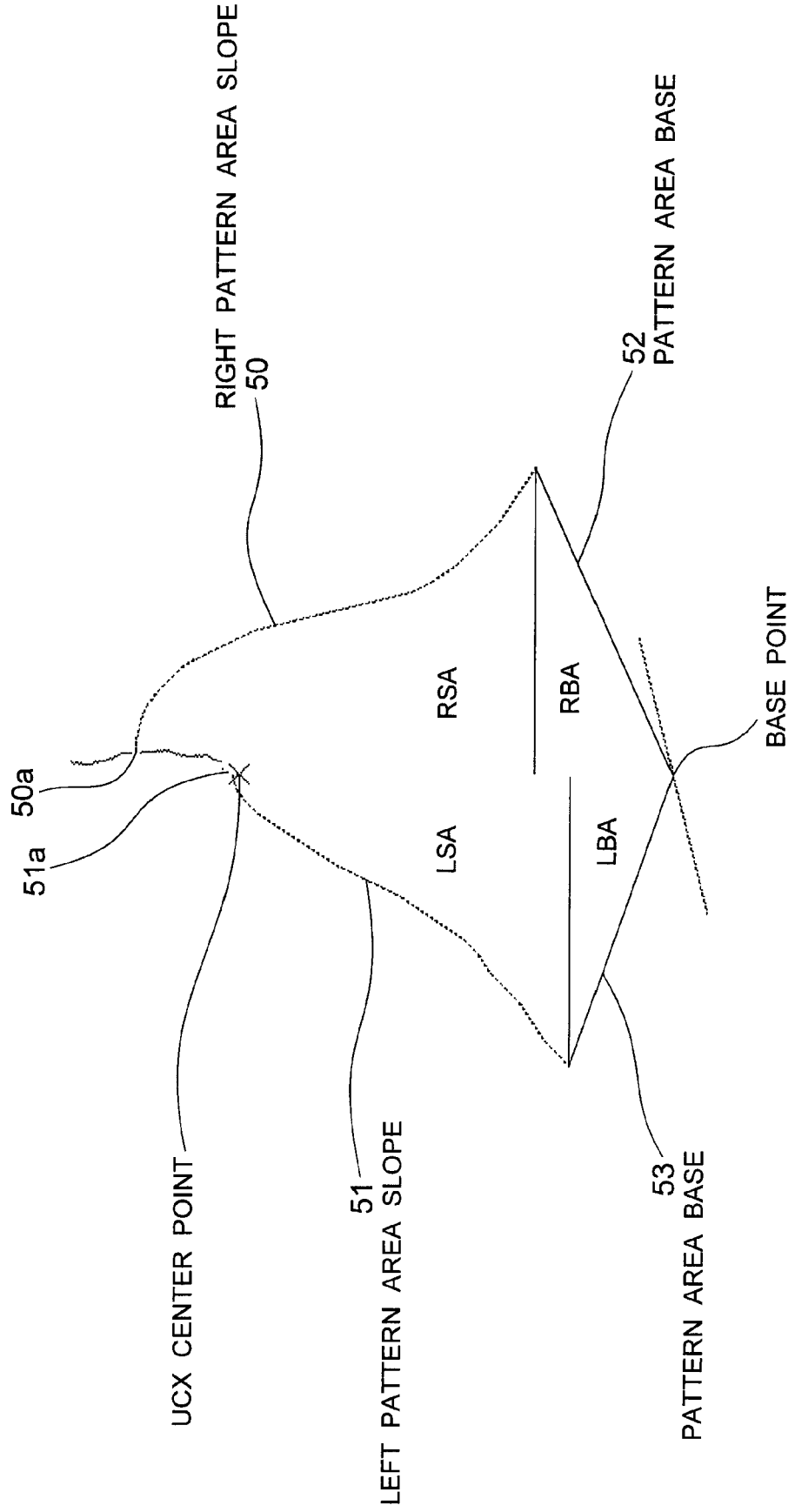
FIG. 11 illustrates an example of internal area of a pattern area.
Figure 12A:
FIG. 12A is a picture for showing a fingerprint image with no pattern area.
Figure 12B:
FIG. 12B is a picture for showing a fingerprint image with a pattern area.
Figure 12C:
FIG. 12C is a picture for showing the result of extracting the pattern area slope of the fingerprint image that has the pattern area.
Figure 12D:
FIG. 12D is a picture for showing the result of extracting the pattern area slope of the fingerprint image that has no pattern area.
Figure 13A:
FIG. 13A is a picture for showing an example of a fingerprint image with a complete pattern area.
Figure 13B:
FIG. 13B is a picture for showing an example of a fingerprint image with a partial pattern area.
Figure 13C:
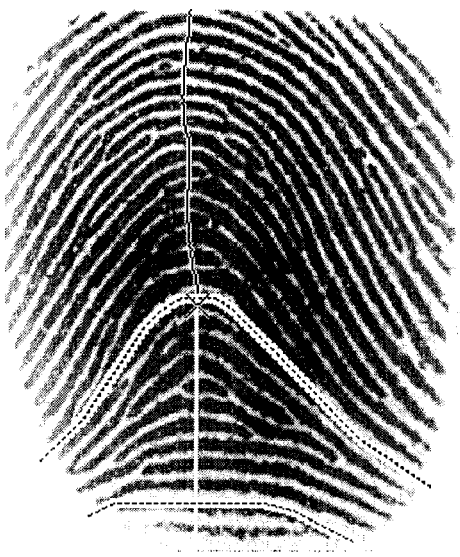
FIG. 13C is a picture for showing the result of extracting the pattern area slope of the fingerprint image that has the complete pattern area.
Figure 13D:
FIG. 13D is a picture for showing the result of extracting the pattern area slope of the fingerprint image that has the partial pattern area.

In this embodiment, a pattern area is extracted as the minimum area surrounded by a right pattern area slope 50, a left pattern area slope 51, and pattern area bases 52, 53, as shown in FIG. 11. The right pattern area slope 50 is a fingerprint ridge, which runs towards the outside on the right side from a start point 50a that is positioned above the center part of the fingerprint image, and satisfies a prescribed condition. The right pattern area slope 50 indicates a ridgeline or valley line of a fingerprint. In the followings description, the right pattern area slope 50 is considered as the ridgeline of the fingerprint. The left pattern area slope 51 is a fingerprint ridge, which runs towards the outside on the left side from a start point 51a that is positioned above the center part of the fingerprint image, and satisfies a prescribed condition. The left pattern area slope 51 indicates a ridgeline or valley line of a fingerprint. In the following description, the left pattern area slope 51 is considered as the ridgeline of the fingerprint. The pattern area bases 52 and 53 are fingerprint ridges which satisfy a prescribed condition and lie almost horizontally beneath the center part of the fingerprint image. The pattern area bases 52 and 53 indicate ridgelines or valley lines of a fingerprint. In the following description, the pattern area bases 52 and 53 are considered as the ridgelines of the fingerprint.

Many of fingerprints include individual fingerprint specific patterns within the extracted areas, so that the patterns are effective for specifying the fingerprints and for specifying the individuals as a result. The pattern area is an area desired to be included commonly at least in two fingerprint images that are the targets of collation. Therefore, it is preferable to be as small as possible, on condition that it includes a characteristic area of the fingerprint. Thus, the minimum area that satisfies a prescribed condition is extracted in this embodiment as well. It is noted that the right and left pattern area slops 50 and 51 are collectively referred to as the pattern area slopes or pattern slopes.

The structure and operation of a fingerprint collation apparatus 10 according to the first embodiment of the present invention will be described by referring to the accompanying drawings.

Figure 1:
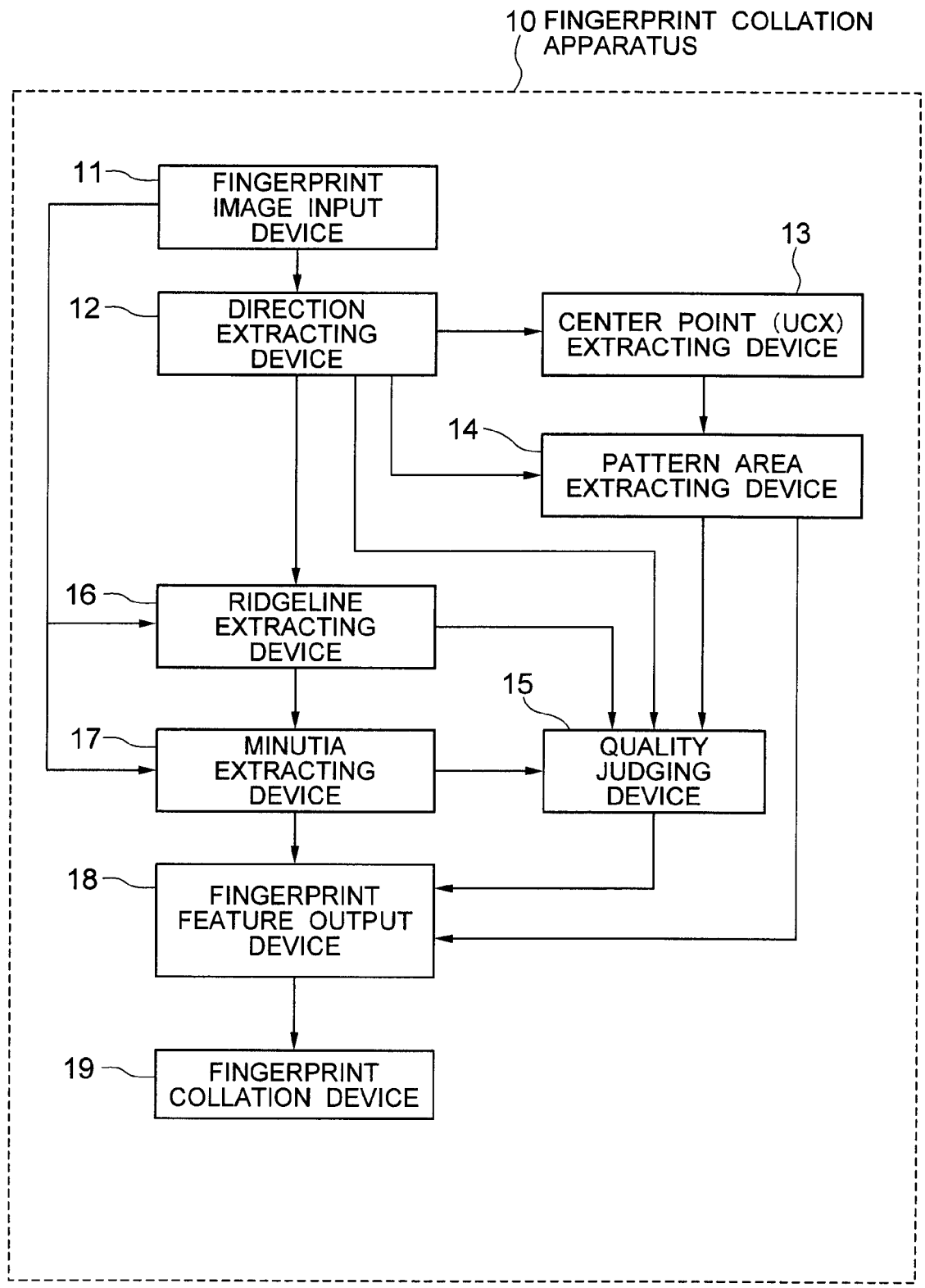
FIG. 1 is a block diagram for showing the structure of a fingerprint collation apparatus according to embodiments of the present invention.

FIG. 1 is a functional block diagram for showing the structure of the fingerprint collation apparatus 10. The fingerprint collation apparatus 10 comprises a fingerprint image input device 11, a direction extracting device 12, a center point (UCX) extracting device 13, a pattern area extracting device 14, a quality judging device 15, a ridgeline extracting device 16, a minutia extracting device 17, a fingerprint feature output device 18, and a fingerprint collation device 19. The present invention is built as the fingerprint collation apparatus 10 shown in FIG. 1, i.e. an exclusive hardware apparatus that has the above-described structures. However, the present invention is not limited to such case. The present invention may also be built into a program as the software for enabling an information processor such as a personal computer to execute the functions of each of the above-described devices.

Further, the present invention is not limited to the fingerprint collation apparatus 10 as the hardware apparatus. The present invention may be built as a fingerprint pattern area extracting apparatus for extracting a pattern area from an inputted fingerprint image, or as a quality evaluation apparatus for evaluating the quality of the fingerprint image based on the pattern area feature quantity that is outputted from the fingerprint pattern area extracting apparatus. Specifically, the fingerprint pattern area extracting apparatus is built as a structure that includes the direction extracting device 12, the center point (UCX) extracting device 13, and the pattern area extracting device 14 shown in FIG. 1. The quality evaluation apparatus is built as a structure that includes the direction extracting device 12, the center point (UCX) extracting device 13, the pattern area extracting device 14, and the quality judging device 15 shown in FIG. 1. Further, although the fingerprint pattern area extracting apparatus and the quality evaluation apparatus shown in FIG. 1 are built as the hardware apparatuses, those are not limited to such case. They may be built into a program as software for enabling an information processor such as a personal computer to execute the functions of each of the fingerprint pattern area extracting apparatus and the quality evaluation apparatus shown in FIG. 1.

In the followings, a case of the fingerprint collation apparatus 10, to which the fingerprint pattern area extracting apparatus and the quality evaluation apparatus are mounted, will be described by referring to FIG. 1.

The fingerprint image input device 11 digitizes and inputs an image of the fingerprint of a hand or foot of a human being or other creature read by a sensor or a scanner, for example. Further, the fingerprint image input device 11 may input a fingerprint image, which has already been processed to electronic data, as a file. The fingerprint inputted to the fingerprint input device 11 may be a flat impression, a rolled impression, or impressions taken by other methods. In general, the mainstream of the fingerprint input used for confirming the identity is to scan the thick of a finger by placing it lightly on a live scanner. Such image scanned in this manner is called a flat impression. Hereinafter, explanations are provided by referring to the case of the flat impression. The plane fingerprint herein is named because it is obtained by impressing only the thick of a finger two-dimensionally without rotating the finger, unlike the rolled fingerprint used in the police force.

The direction extracting device 12 extracts the directions of the ridgelines of the fingerprint based on each point on the ridgelines of the fingerprint from the fingerprint image that is inputted through the fingerprint image input device 11, calculates the reliability of the extracted direction of the ridgelines of the fingerprint (direction reliability), and outputs it as the ridgeline direction data.

The center point (UCX) extracting device 13 extracts the center point of the fingerprint from the ridgeline direction data that is outputted from the direction extracting device 12.

The pattern area extracting device 14 extracts a pattern area based on the ridgeline direction data outputted from the direction extracting device 12 and the center point outputted from the center point (UCX) extracting device 13. Further, the pattern area extracting device 14 calculates a prescribed value that indicates the feature of the extracted pattern area, i.e. extracts the pattern area feature quantity. The pattern area feature quantity calculated by the pattern area extracting device 14 includes the evaluation value of the completeness of the pattern area and the dimension of the pattern area, for example.

The quality judging device 15 calculates the quality value that shows the fingerprint quality quantitatively based on the direction reliability outputted from the direction extracting device 12, the coordinate information of the pattern area and the pattern area feature quantity outputted from the pattern area extracting device 14, the ridgeline quality outputted from the ridgeline extracting device 16, and the minutia reliability outputted from the minutia extracting device 17. Further, the quality judging device 15 performs final judgment of the quality by using the calculated quality value so as to determine whether or not it is the acceptable quality or the quality to be rejected.

The ridgeline extracting device 16 extracts the fingerprint ridgelines and the data of the ridgeline quality from the fingerprint image by using the ridgeline direction data extracted by the ridgeline direction extracting device 12.

The minutia extracting device 17 extracts the minutia of the ridgelines and the data of the minutia reliability from the ridgelines of the fingerprint extracted by the ridgeline extracting device 16.

The fingerprint feature output device 18 outputs the center point data extracted by the center point (UCX) extracting device 13, the pattern area coordinate information and the pattern area feature quantity extracted by the pattern area extracting device 14, the quality extracted by the quality judging device 15, and the minutia data extracted by the minutia extracting device 17.

The fingerprint collation device 19 performs collation of the inputted fingerprint image and the fingerprint stored in the fingerprint database (not shown) based on the output of the fingerprint feature output device 18.

Figure 2:
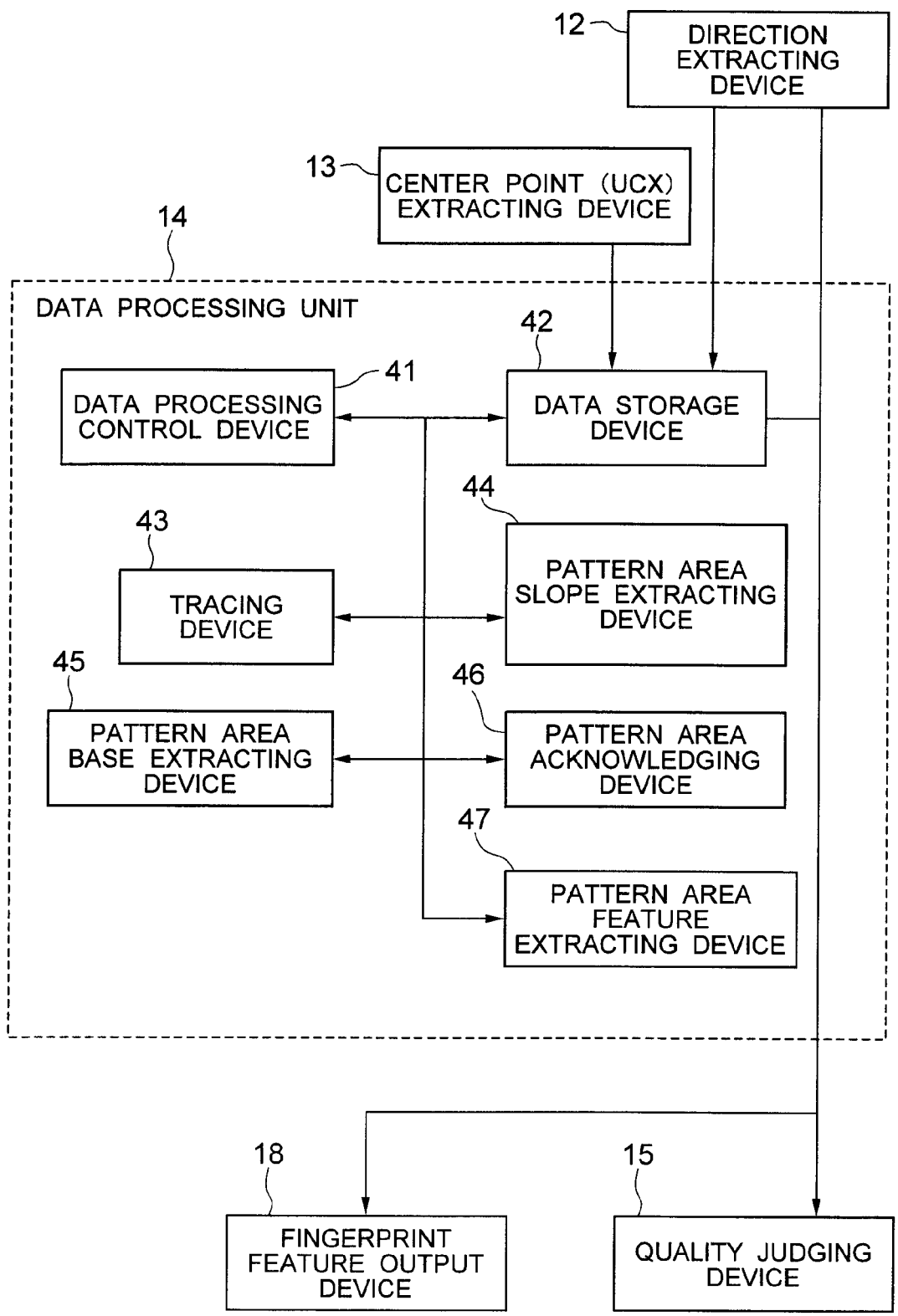
FIG. 2 is a block diagram for showing the structure of a pattern area extracting device according to the embodiments of the present invention.

FIG. 2 is a functional block diagram for showing an example of the specific structure of the pattern area extracting device 14. The pattern area extracting device 14 comprises a data processing control device 41, a data storage device (memory device) 42, a tracing device 43, a pattern area slope extracting device 44, a pattern area base extracting device 45, a pattern area acknowledging device 46, and a pattern area feature quantity extracting device 47.

The data processing control device 41 controls exchanges of data and messages among each of the devices that constitute the pattern area extracting device 14.

The data storage device 42 is constituted with a RAM (Random Access Memory), for example, which secures the work areas of each of the devices that constitute the pattern area extracting device 14, and temporarily stores the information calculated by each device. Further, the data storage device 42 stores data exchanged among the direction extracting device 12, the center point (UCX) extracting device 13, the quality judging device 15, the fingerprint feature output device 18, and the pattern area extracting device 14.

Having one point (pixel) on the ridgelines of a given fingerprint as a start point, the tracing device 43 extends a continuous line along the ridgeline direction extracted by the direction extracting device 12 towards an adjacent pixel of that start pixel to trace the ridgeline of the fingerprint.

The pattern area slope extracting device 44 checks a pixel group on the upper side starting from the fingerprint center point such as the UCX center point, and extracts trace lines that surround the pattern area from the top as pattern area slopes. The pattern area slopes include the right pattern area slope 50 and the left pattern area slope 51 shown in FIG. 11.

The pattern area base extracting device 45 checks a pixel group on the lower side starting from the UCX center point, and extracts trace lines that surround the pattern area from the bottom as the pattern area bases. The pattern area bases include the pattern area bases 52 and 53 shown in FIG. 11.

The pattern area acknowledging device 46 acknowledges the area surrounded by the pattern area slopes and the pattern area bases extracted by the pattern area slope extracting device 44 and the pattern area base extracting device 45, and outputs the area information such as the position and the shape.

The pattern area feature quantity extracting device 47 extracts the feature quantities regarding the pattern area such as the pattern area vertex, the height of the pattern area, and the angles of the right and left pattern area slopes, etc., based on the data of pattern area slopes and the pattern area bases extracted by the pattern area slope extracting device 44 and the pattern area base extracting device 45.

(2) Explanation of Operation

Figure 3:
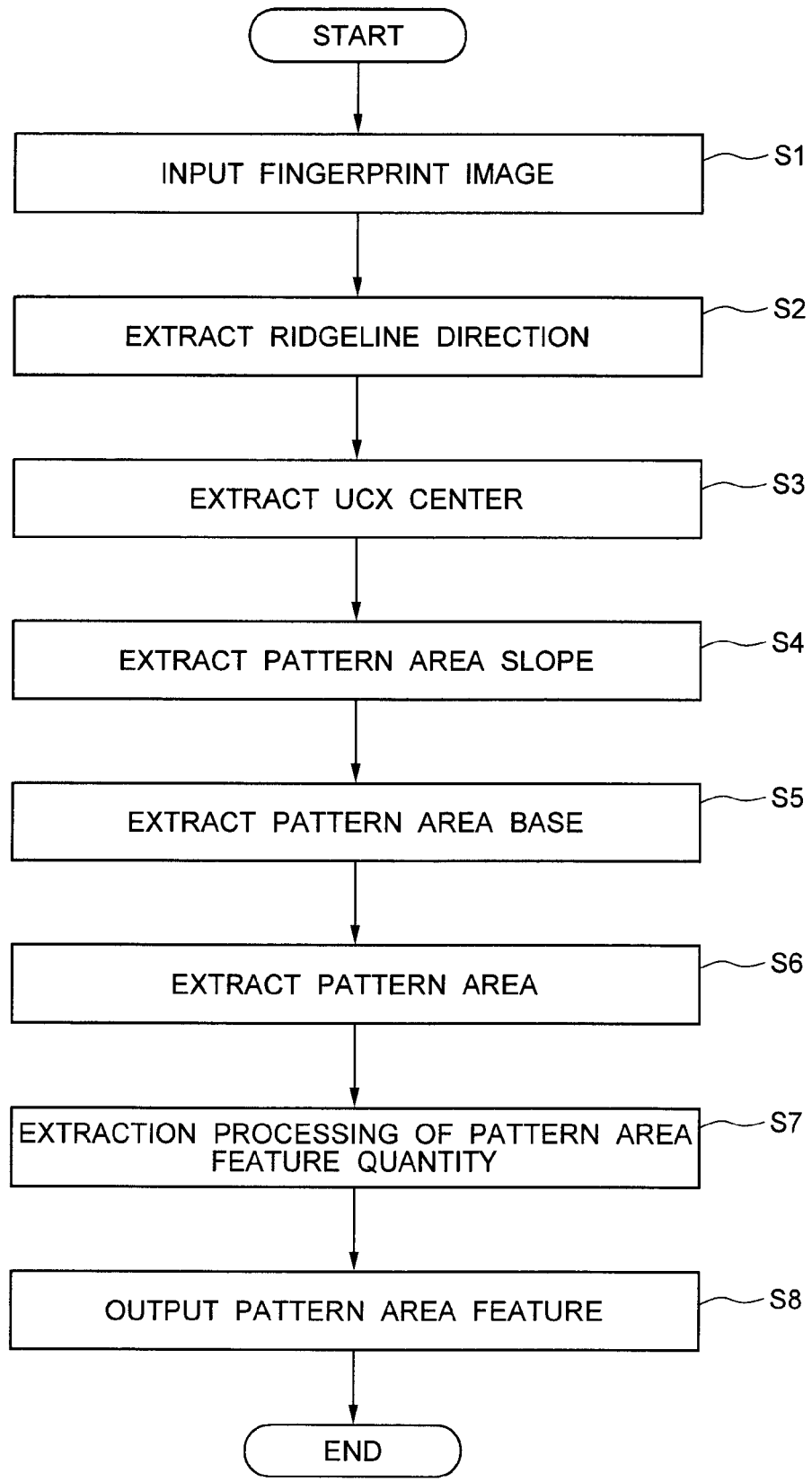
FIG. 3 is a flowchart of pattern area feature extracting processing according to a first embodiment.

Next, the operation of the embodiment will be described. FIG. 3 is a flowchart for showing the operations of the entire pattern area extracting device 14, as well as the fingerprint image input device 11, the direction extracting device 12, and the center point (UCX) extracting device 13.

(2.1) Fingerprint Image Input

The fingerprint image input device 11 shown in FIG. 1 inputs a fingerprint image (step S1 of FIG. 3). The fingerprint image input device 11 digitizes and inputs an image read by a scanner, or inputs a fingerprint image file that has already been processed into electronic data.

The example of the fingerprint image described in the followings is a digitized image of a fingerprint image that is read by a sensor or a scanner. This example of the fingerprint image is digitized with 500 dpi resolution in accordance with ANSI/NIST-ITL-1-2000 Data Format for the Interchange of Fingerprint, Facial & Scar Mark & Tattoo (SMT) Information that is standardized by the National Institute of Standards and Technology of the U.S. The numerical values such as the parameters employed in this embodiment are set for the fingerprint image with 500 dpi resolution.

(2.2) Extraction of Ridgeline Direction

Next, the direction extracting device 12 shown in FIG. 2 divides the fingerprint image into a plurality of small zones, and calculates the ridgeline direction and the direction reliability by each zone (step S2 of FIG. 3). The direction extracting device 12 performs the above-described processing by using a calculation method described in a conventional technique. The calculation method shown in the conventional technique is disclosed in Japanese Unexamined Patent Publication 2002-288641, for example. In the calculation method, two-dimensional Fourier transformation is applied to the image of the zone where the ridgeline direction is to be determined, and the ridgeline direction of the local zone is determined by analyzing the peak of the Fourier-transformed surface obtained as a result of the transformation. The direction reliability in this case can be calculated based on the power in the periphery of the peak. The direction extracting device 12 may also perform the calculation by using other methods.

The accuracy of the direction extraction is improved by setting the size of the zone smaller when the direction extracting device 12 divides the fingerprint image into a plurality of small zones. However, it takes longer processing time in that case. Therefore, the size of the zones divided by the direction extracting device 12 is determined appropriately by considering the required accuracy of the direction extraction and the processing capacity of the apparatus or the computer.

In this embodiment, the zone size divided by the direction extracting device 12 is set as eight-pixel square to improve the accuracy of the tracing.

The direction extracting device 12 extracts the directions of each point on the ridgelines of the fingerprint (referred simply to as the directions hereinafter) by every divided zones described above, and calculates the direction reliability. When the direction cannot be extracted, the direction extracting device 12 determines that the direction of that point is undefined.

Figure 8:
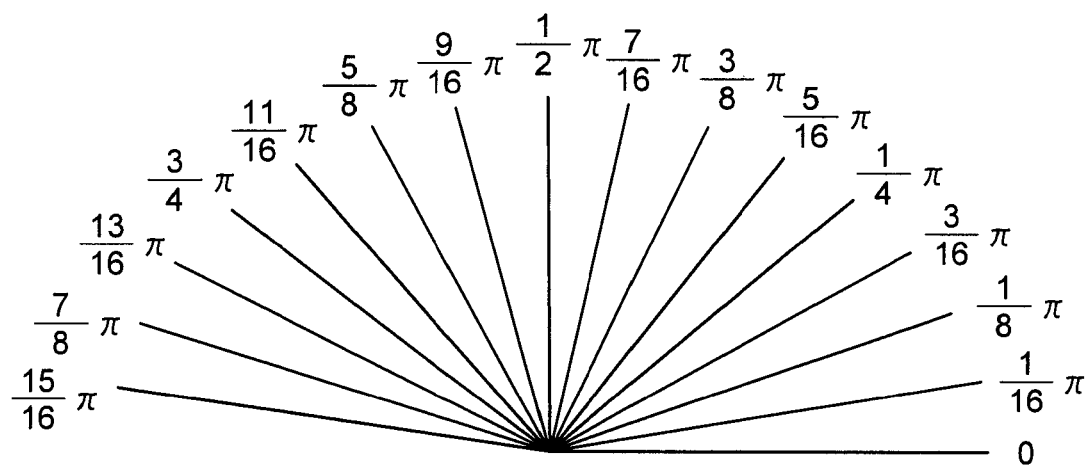
FIG. 8 is an illustration for showing the directions of the fingerprint ridges.

The direction herein refers to the angle or the like with respect to the horizontal direction of a straight line, when the fingerprint ridge within each zone is considered as the straight line. Each direction herein refers to two directions along the straight line. The direction is expressed with a code allotted to each of the directions being divided into sixteen directions as shown in FIG. 8. FIG. 8 shows the ridgeline directions in sixteen courses, each of which is increased by $\pi/16$ radian in the counterclockwise direction with respect to the horizontal direction. Other than the directions being divided into sixteen courses, the ridgeline directions may also be expressed with codes allotted to directions being divided into eight or four courses. When the number of dividing the directions is decreased, the accuracy is deteriorated. In the meantime, it only requires short processing time in that case. Therefore, the number of divided directions may be determined appropriately by considering the accuracy of the result and the processing capacity of the apparatus or the computer.

Figure 4A:
FIG. 4A is a picture for showing an example of a fingerprint image (Arch)
Figure 4B:
FIG. 4B is a picture for showing an pattern slope and the like which are extracted from the example of the fingerprint image (Arch)
Figure 5A:
FIG. 5A is a picture for showing an example of a fingerprint image (Left Slanted Loop)
Figure 5B:
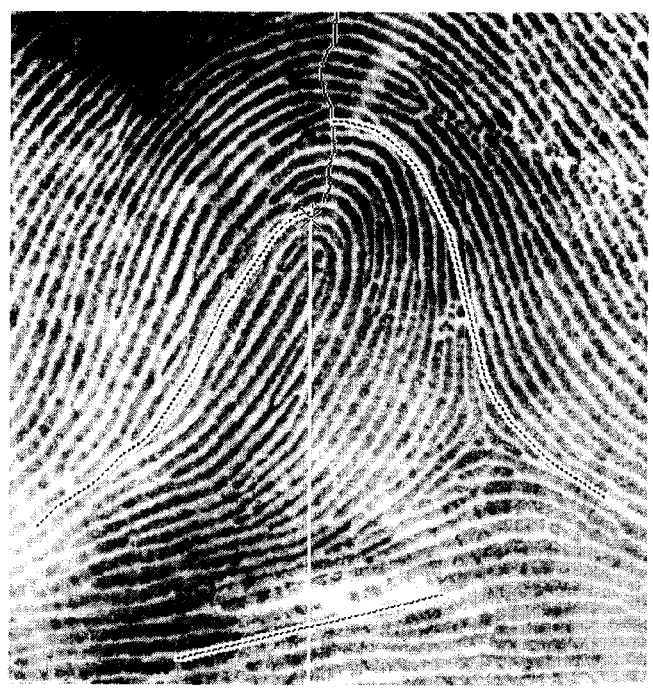
FIG. 5B is a picture for showing an pattern slope and the like which are extracted from the example of the fingerprint image (Left Slanted Loop)
Figure 6A:
FIG. 6A is a picture for showing an example of a fingerprint image (Right Slanted Loop)
Figure 6B:
FIG. 6B is a picture for showing an pattern slope and the like which are extracted from the example of the fingerprint image (Right Slanted Loop)
Figure 7A:
FIG. 7A is a picture for showing an example of a fingerprint image (Whorl)
Figure 7B:
FIG. 7B is a picture for showing an pattern slope and the like which are extracted from the example of the fingerprint image (Whorl)
Figure 9:
FIG. 9 shows examples of extracted direction data.

FIG. 9 shows the result when the directions of the fingerprint example shown in FIG. 4 are extracted by the method disclosed in Japanese Examined Patent Publication 59-27945. In FIG. 9, the ridgeline directions of the small zone of eight-pixel square are shown with short lines that indicate the sixteen courses as shown in FIG. 8.

(2.3) Extraction of Center

Next, the center point (UCX) extracting device 13 shown in FIG. 2 extracts the UCX center point based on the data of the ridgeline directions extracted by the direction extracting device 12 (step S3 of FIG. 3). The UCX (Upward Convex) center point is one of the center points of the fingerprint, and is the vertex of the ridgeline with the largest curvature among a group of the ridgelines that form upwardly convex arching curves. In the field of identification, generally, the center point of the fingerprint is referred to as a core, which indicates the vertex of a core line in a whorl type or a loop type. The UCX center point is named for discriminating it from the core of a general definition. The center point (core) of the fingerprint of the general definition is not present in an arch type, however, the UCX center point exists therein. Thus, extraction of the pattern area based on the UCX center point is excellent because it can be applied to various kinds of fingerprints.

Automatic extraction of the UCX center point can be achieved by using the conventional techniques that are disclosed in Japanese Patent No. 002690103, "Fingerprint center detecting apparatus", Japanese Patent No. 002637764, "Fingerprint center detection system" and the U.S. patent of those techniques, U.S. Pat. No. 5,040,224, "Fingerprint Processing System Capable of Detecting a Core of a Fingerprint Image by Statistically Processing Parameters". In these patent Publications, the center points extracted therein are UCX center points, although it is not clearly stated so. The center point (UCX) extracting device 13 may execute the above-described processing by using methods other than the above-described method.

The embodiment is not limited only to extraction of the pattern area based on the UCX center point, and it is possible to extract the pattern area based on the core described above. The core can be extracted by simply analyzing the ridgelines of a narrow area including the core and the ridgeline direction. Thus, it requires fewer amounts of calculations compared to the extraction of the UCX center point that requires analysis of the entire area of the fingerprint. Therefore, the method of extracting the pattern area based on the core is excellent, in respect that it can shorten the extraction time.

Figure 10:
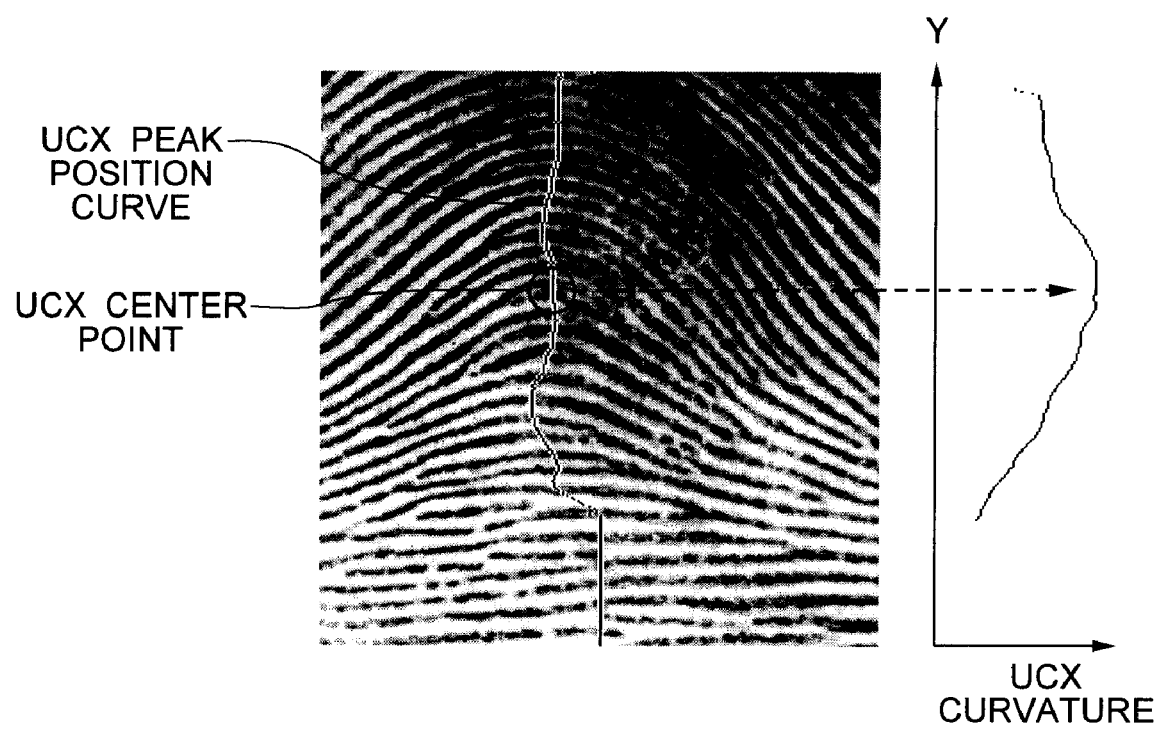
FIG. 10 illustrates changes in the UCX curvature and an example of the UCX center point.

FIG. 10 shows the UCX center point that is extracted from the finger image of FIG. 4 by the above-described technique. In the fingerprint image shown in FIG. 10, the curve drawn in the vertical direction is formed by selecting the pixels whose UCX curvatures are the largest from each of the pixels on the horizontal line (on the same Y-coordinate), and connecting those pixels. The pixel with the largest UCX curvature can be considered as the peak position of the arch ridgelines containing that pixel, so that this curve is referred to as a UCX peak position curve.

The curve graph shown on the right side of the fingerprint image in FIG. 10 shows the UCX curvature, in which the UCX curvature becomes higher as going towards the right side. In the arch type of this example, the pixel with the largest UCX curvature is extracted as the UCX center point.

(2.4) Extraction of Pattern Area Slope

Next, the pattern area slope extraction device 44 of FIG. 2 extracts the pattern area slopes (step S4 of FIG. 3). The pattern area slope extraction device 44 of this embodiment extracts the pattern area slopes that are closest to the center point of the fingerprint such as the UCX center point. Because it becomes possible to include the pattern area in a plane fingerprint of a small scanned size with a higher probability by extracting the smallest area that surrounds the pattern area.

The data of the direction and the UCX center point necessary for the pattern area slope extraction processing is taken out from the data storage device 42 by the data processing control device 41, and given to the pattern area slope extracting device 44.

If the UCX center point cannot be extracted, the processing is ended with the extraction of the pattern area being failed.

The core of the pattern area slope extraction processing is the trace processing for tracing the ridgelines of the fingerprint. This is performed by the tracing device 43 of FIG. 2. First, the ridgeline tracing method will be described.

As the ridgeline tracing method, a method in which the ridgeline itself is extracted and traced, or a method in which the ridgeline is traced in a simulated manner along the stream of the ridgeline by using the ridgeline direction data may be used. In this embodiment, the ridgeline is traced in a simulated manner along the stream of the ridgeline by using the ridgeline direction data. This method is excellent in respect that the tracing accuracy is hardly deteriorated even when the ridgelines are not properly extracted, and it requires no extra processing time for extracting the ridgelines.

The method for tracing based on the ridgeline direction can be achieved by a method that is disclosed in U.S. Pat. No. 4,047,154, "Operator Intervention Pattern Processing System".

The tracing device 43 checks the ridgeline direction of the start point (pixel) that is supplied from the pattern area slope extracting device 44. There are two directions for the ridgeline directions as described above. The tracing device 43 extends the line for about three pixels along the directions indicated by the pattern area slope extracting device 44, and checks the ridgeline directions of the reached pixels (extension pixels). The tracing device 43 determines the two pixels that are reached by further extending the line along the two directions of the ridgeline directions of the extension pixels, and takes those pixels as the candidate extension pixels. The tracing device 43 calculates the distances between each of the two candidate extension pixels and the pixels before those pixels, and employs the further candidate extension pixel as the extension pixel.

The tracing device 43 achieves the tracing of the ridgelines using the direction data by repeating this processing.

The pattern area slope extraction processing is performed separately for the right slope sloping downwards to the right side and the left slope sloping downwards to the left side. First, the right slope extraction method will be described.

S41) The UCX center point is set as an initial value of the trace start point.

S42) The direction of the set start point is checked. When the direction of that point is extracted, i.e. it is defined, the processing proceeds to a next step S43. When the direction of that point is undefined, the processing is ended with the extraction of the pattern area slope being failed.

S43) Tracing is started, having the rightward direction of the pixel direction from the set start point is taken as the extending direction.

S44) If the following ending conditions are satisfied when checking the coordinates of the trace extension pixel, tracing is ended, and the processing is proceeded to a next step S45.

Ending condition 1: When the horizontal distance (difference in X-coordinate) between the extension pixel and the start point exceeds a threshold value (for example, 180 pixels).

Ending condition 2: When the ridgeline direction of the extension pixel is undefined.

Ending condition 3: When the extension pixel reaches the border of the image area.

Ending condition 4: When the X-coordinate of the extension pixel comes on the inner side (left side) of the X-coordinate of the already-reached pixel, i.e. the tracing curve returns to the inner side of the finger.

S45) The followings are checked to judge whether or not the trace line can be considered as the pattern area slope.

Judging condition 1: It is determined as the pattern area slope, when tracing is ended according to the ending condition 1.

Judging condition 2: When tracing is ended according to the ending conditions 2 or 3, it is judged by a combination of the horizontal distance (X-coordinate) between the end pixel (the last extension pixel) and the start point and the curving degree of the pattern slope curve in the vicinity of the end. Specifically, it is determined as the pattern area slope when the horizontal distance between the end pixel and the start point is more than 80 pixels and the trace line in the vicinity of the end is a concave facing downwards to the left. This judgment of concave in this embodiment is performed based on the difference in the directions of pixel A that is traced back by 25 pixels from the end pixel E and pixel B traced back by 50 pixels from the end pixel E. That is, the direction EA and the direction EB are compared. If the direction EA is closer to vertical than the direction EB is, it is determined as the concave facing downwards to the left.

Judging condition 3: When tracing is ended according to the ending condition 4, it is determined as non-pattern area slope.

Judging condition 4: When it does not meet the judging conditions described above, it is considered as unjudgeable.

S46) When judged that it is a pattern area slope, the trace line is outputted as the pattern area slope and the processing is ended. When judged as unjudgeable, it is determined that the pattern area slope cannot be extracted, and the processing is ended. When judged that it is a non-pattern area slope, the processing is proceeded to a next step S47.

Figure 14:
FIG. 14 is a picture for showing an example of a fingerprint image having a large pattern area.

S47) A pixel above the previous start point is set as a next start point, and the processing is returned to step S43. In this embodiment, the UCX peak position on the horizontal line at four pixels above is taken as the above pixel. However, the coordinates at four pixels above may simply be employed. When the next start point reaches the boundary of the image area, the processing is ended considering that the pattern area slope cannot be extracted. For an embodiment provided with a function of extracting a delta (see FIG. 14), it is considered to add a condition, "when the trace line reaches the outside the delta", as the condition for judging the pattern area slope.

Next, the threshold values and the parameters employed herein will be described by referring to a specific example.

The fingerprints shown in FIG. 4A, FIG. 5A, FIG. 6A, and FIG. 7A are typical fingerprint examples of different pattern types. In FIG. 4B, FIG. 5B, FIG. 6B, and FIG. 7B, the pattern area slopes and the pattern area bases extracted by the method of the present invention are superimposed on the fingerprints shown in FIG. 4A, FIG. 5A, FIG. 6A, and FIG. 7A.

Further, FIG. 12A, FIG. 12B, and FIG. 13A, FIG. 13B are examples of a flat impression with a small impression area. In FIG. 12C, FIG. 12D and FIG. 13C, FIG. 13D, the pattern area slopes and the pattern area bases extracted by the method of the present invention are superimposed on each of those fingerprints.

The pattern slope areas in the figures are shown by curved lines with a blank inside, including a black dotted line therein. The curved line with a blank inside that includes no black dotted line is an extended trace line of the pattern area slope. In this embodiment, the range of the pattern area slope is considered as being within 180 pixels from the start point in the horizontal distance.

The threshold value of the ending condition 1 of step S44 is set as 180 pixels. This is a value larger than the horizontal distance between the UCX center and the delta in most of the fingerprints. Thus, when there are more than 180 pixels in the horizontal distance, the pattern area is included therein.

The threshold value and the parameter of the judging condition 2 of step S45 will be described. There is a case where the trace line can be judged as a pattern area slope even if the horizontal distance between the start point and the end point is short. It is the case where the trace line in the vicinity of the end pixel extends downwards to the left in a convex form, i.e. extends towards the outside. For example, the right slope in the fingerprint image example of FIG. 13 has only about 70 pixels in the horizontal distance between the start point and the end point. However, the trace line extends downwards to the left in a concave form, so that it can be judged as a pattern area slope.

In the embodiment provided with a pattern type extracting function, it is possible to set the pattern slope judging condition still more minutely. For example, in the case where it can be judged as an arch type, the pattern area can be judged even when the horizontal distance between the start point and the end point of the trace line is less than 60 pixels.

Next, it proceeds to the extraction processing of the left pattern area slope. This processing is the same as the processing of the right slop, except that the extending direction from the start point is different and the inner side and the outer side directions are different. Therefore, explanations thereof will be omitted.

(2.5) Extraction of Pattern Area Base

Next, the pattern area base extracting device 45 shown in FIG. 2 extracts the bases of the pattern area (step S5 of FIG. 3). The direction and the data of the UCX center point necessary for the pattern area base extraction processing are taken out from the data storage device 42 by the data processing control device 41, and given to the pattern area base extracting device 45.

The pattern area bases (reference numerals 52 and 53 of FIG. 11) are the ridgelines that are closest to the UCX center point among the horizontal ridgelines present beneath the UCX center point.

The pattern area base extraction processing will be described in detail.

S51) A point that is about 10 pixels below the UCX center point is set as an initial value of the trace start point.

S52) The direction of the set start point is checked. When the direction is defined and that direction is considered almost being the horizontal direction (for example, the inclination is less than ¼ radian), it is advanced to a next step S53. Otherwise, it can be judged as the non-pattern area base, so that the processing is shifted to step S58.

S53) Tracing in the pixel direction is started from the set start point. This tracing is carried out twice to the right and left sides.

S54) If the following ending conditions are satisfied when checking the coordinates of the trace extended pixel, tracing is ended.

Ending condition 1: When the horizontal distance (difference in X-coordinate) between the extension pixel and the start point reaches a specific value (for example, 64 pixels).

Ending condition 2: When the ridgeline direction of the extension pixel is undefined (unknown).

Ending condition 3: When the extension pixel reaches the border of the image area.

Ending condition 4: When the X-coordinate of the extension pixel comes on the inner side of the X-coordinate of the already-reached pixel.

S55) When both of the trace lines on the right and left end according to the ending condition 1, 2, or 3, the horizontal distance (X-coordinate) between the end points on the right and left sides is checked. If there is a sufficient distance for the base lines (for example, 64 pixels or more), it is advanced to a next step S56. Otherwise, the processing is ended considering that the pattern area bases cannot be extracted. When either one of the trace line on the right or the left is ended according to the ending condition 4, it can be judged as a non-pattern area base. Thus, the processing is shifted to step S58.

S56) The curving degree of the trace line and the inclination of the trace line are checked to determine whether or not it can be considered as the pattern area base. Specifically, it is judged according to the following condition.

Judging condition 1: The left end point is referred to as L, the right end point as R, and the center point of the left and right end points as C. When the difference (angle) between the direction LC and the direction CR is within ¹⁄₁₆ radian, and the difference (angle) between the direction of a line segment connecting the highest point (largest Y-coordinate) and the smallest point (the smallest Y-coordinate) of the trace line and the horizontal direction is within 3/16 radian, it is determined as the pattern area base.

Judging condition 2: When it does not satisfy the judging condition 1, it is determined as a non-pattern area base.

S57) When judged that it is a pattern area base, the trace line is outputted as the pattern area base and the processing is ended. When judged that it is a non-pattern area base, the processing is advanced to a next step S58.

S58) A pixel beneath the previous start point (for example, the pixel that is 4 pixels therefrom in the lower direction) is set as the next start point, and the processing is returned to step S52. When then next start point reaches the boundary of the image area, the processing is ended considering that the pattern area base cannot be extracted.

The pattern area bases extracted in this manner are shown in FIG. 4B, FIG. 5B, FIG. 6B, and FIG. 7B.

(2.6) Extraction of Pattern Area

Next, the pattern area acknowledging device 46 of FIG. 2 extracts the pattern area. That is, the pattern area acknowledging device 46 confirms the boundary of the pattern area, and outputs the coordinate data that specifies the pattern area (step S6 of FIG. 3). The pattern area acknowledging device 46 extracts the pattern area by dividing it into four regions as shown in FIG. 11.

When the right pattern area slope can be extracted, the pattern area acknowledging device 46 extracts, as the right slope area (RSA), the area surrounded by the right slope, the UCX peak position curve that connects the vertex of the right slope and the UCX center point, a line segment drawn vertically from the UCX center point, and a horizontal line drawn from the smallest point of the right slope. When the right pattern area slope cannot be extracted, there is no extraction of the right slope area.

Similarly, when the left pattern area slope can be extracted, the pattern area acknowledging device 46 takes, as the left slope area (LSA), the area surrounded by the left slope, the UCX peak position curve that connects the vertex of the left slope and the UCX center point, a line segment drawn vertically from the UCX center point, and a horizontal line drawn from the smallest point of the left slope. When the left pattern area slope cannot be extracted, there is no extraction of the left slope area.

When the pattern area base and the right pattern area slope can be extracted, the pattern area acknowledging device 46 takes, as the right base area (RBA), the area surrounded by the line segment that connects the pattern area base point and the smallest point of the right slope, and the intersection of the horizontal line drawn from the smallest point of the right slope and the line segment drawn vertically from the UCX center point. When the pattern area base or the right pattern area slope cannot be extracted, there is no extraction of the right base area.

When the pattern area base and the left pattern area slope can be extracted, the pattern area acknowledging device 46 takes, as the left base area (LBA), the area surrounded by the line segment that connects the pattern area base point and the smallest point of the left slope, and the intersection of the horizontal line drawn from the smallest point of the left slope and the line segment drawn vertically from the UCX center point. When the pattern area base or the left pattern area slope cannot be extracted, there is no extraction of the left base area.

Through extracting the pattern area by dividing it in the manner described above, it becomes possible to extract the pattern area even if the pattern area of the inputted fingerprint image is incomplete. In addition, it becomes possible to evaluate the completeness of the pattern area with multiple stages, so that it is possible to obtain the fingerprint quality with high accuracy.

The extraction method of the pattern area is not limited only to this method. The pattern area may be extracted as a single continuous area by connecting the end points of the pattern slopes and the pattern bases with a straight line.

(2.7) Extraction of Pattern Area Feature Quantity

Next, the pattern area feature quantity extracting device 47 of FIG. 2 extracts the various kinds of feature quantities relating to the pattern area (step S7 of FIG. 3). The pattern area feature quantities are prescribed values which indicate the characteristics of the pattern area. The data (the right and left pattern slopes, pattern area bases) necessary for the extraction processing of the pattern area feature quantities is taken out from the data storage device 42 by the data processing control device 41, and given to the pattern area feature quantity extracting device 47.

There are following kinds in the pattern area feature quantities.

1) The coordinate of the vertex of the right pattern area slope (right slope vertex)
2) The coordinate of the vertex of the left pattern area slope (left slope vertex)
3) The distance between the right slope vertex and the left slope vertex (distance between the right and left slope vertexes)
4) The distance between the right slope vertex and the pattern area base point (height of the right slope vertex)
5) The distance between the left slope vertex and the pattern area base point (height of the left slope vertex)
6) The angle formed between the right slope and the fingertip direction (right slope angle)
7) The angle formed between the left slope and the fingertip direction (left slope angle)
8) The angle between the right slope and the left slope (angle between the right and left slopes)
9) The dimension of the pattern area (right slope dimension, left slope dimension, right base dimension, left base dimension)
10) Evaluation value for the completeness of the pattern area The pattern area base point means the intersection point between the line segment drawn vertically from the UCX center point and the pattern area base. The methods for extracting the feature quantities of 1) to 10) in the above-described feature quantities are simple calculations of the two-dimensional figure as shown in FIG. 11, so that explanations thereof will be omitted.

The fingertip direction is a direction with the fingertip facing the straightforward direction. In this embodiment, it is assumed that the fingerprint image is placed in such a manner that the fingertip points at the straightforward direction. Thus, the fingertip direction is the positive direction of the Y-axis in this embodiment.

If the fingerprint image is not placed in such a manner that the fingertip faces the straightforward direction, the axial direction of the fingertip may be extracted and the image may be rotated so that the fingertip faces the straightforward direction. Extraction of the fingertip axis can be automatically performed by existing techniques such as those disclosed in Japanese Unexamined Patent Publication 08-279039 and its US patent, U.S. Pat. No. 5,848,176.

Further, for the dimension of the pattern area described in 9), the total value of the number of pixels, which are contained inside the area that can be extracted among the above-described right slope area (RSA), the left slope area (LSA), the right base area (RBA), and the left base area (LBA), is extracted as the dimension.

Furthermore, in this embodiment, the evaluation values for the completeness of the pattern area described in 10) are set in the following stages where the completeness evaluation value becomes higher for the pattern area with higher completeness.

Stage 1: When the right and left slopes and the pattern area bases are defined, there is a pattern area in a complete form.

Stage 2: When the right slope and the pattern area bases are defined, only the pattern area of the right side exists completely. Alternatively, when the left slope and the pattern area bases are defined, only the pattern area of the left side exists completely.

Stage 3: When the right slope is defined, only the right side exists incompletely. Alternatively, when the left slope is defined, only the left side exists incompletely.

Stage 4: No pattern area can be extracted.

The way of defining the evaluation values for the completeness is not limited to that of the embodiment. The evaluation values may be changed depending on the extent of the dimensions of each area described above and the height of the slopes. The point is that the evaluation values may be defined based on the characteristics of the extracted pattern area.

Next, the data processing control device 41 shown in FIG. 2 takes out the pattern area feature quantity from the data storage device 42, and gives it to the quality judging device 15 and the fingerprint feature output device 18, and ends the pattern area extraction processing (step S7 of FIG. 3).

(2.8) Judgment of Quality

The quality judging device 15 determines the fingerprint quality by totally judging the data regarding the quality. By the use of the pattern area feature quantities, the quality judging device 15 can also utilize the data regarding the pattern area completeness, the pattern area dimension, and the ridgeline quality within the pattern area. Therefore, it becomes possible to improve the accuracy of the quality judgment.

Now, an example where the quality judging device 15 utilizes the result of the quality judgment obtained by using the pattern area feature quantities, and an example of calculating the quality value will be described in detail.

In an example where the pattern area feature quantity is extracted immediately after scanning, the quality judging device 15 can perform accurate judgment on whether to accept or reject the scan image by using the pattern area completeness evaluation values. For example, when the pattern area is complete, the quality judging device 15 accepts the scan image and performs collation. However, if it is incomplete, the image may be rejected. When rejected, rescanning of the fingerprint can be requested.

Next, there will be described an example of the case where the result of quality judgment is outputted as the quality value in an apparatus or a program that handles the fingerprint data of a flat impression. The pattern area quality value (cnfPA) and the quality values (cnfLPA, cnfRPA) of the left and right slope areas employed in this example are calculated by using the pattern area completeness evaluation values and the pattern area ridgeline quality. The base equation is as follows. The quality value is expressed by a scale of 0 to 100, and the quality becomes higher as it goes closer to 100. That is, it can be expressed by a following equation.

Pattern area quality value=Pattern area completeness contribution+Pattern area ridgeline quantity contribution The pattern area completeness contribution is defined based on the pattern area completeness evaluation value. For example, when the pattern area is complete, it is 100 points. When either the right or the left side exists completely, it is 50 points. When one of the right or the left exists incompletely, it is 25 points. When the pattern area cannot be extracted at all, it is 0 point. In the following, described is a case where 100 points are given when the pattern area is complete, and 0 point is given in other cases.

Further, the pattern area ridgeline quality value is defined as the ratio of the number of high-quality ridgeline pixels judged based on a prescribed standard in the number of entire ridgeline pixels within the region of the pattern area. As the prescribed standard for judging the high-quality ridgeline pixels, it can be so defined that the direction intensity is higher than a certain threshold value, etc. as disclosed in above-described Patent Literature 1 (Japanese Unexamined Patent Publication 2002-32757) and Patent Literature 2 (Japanese Unexamined Patent Publication 2003-337949). Further, a weight of 3:7 is given to the pattern area completeness contribution and the pattern area ridgeline quality contribution. Needless to say, this ratio may be changed as necessary. Furthermore, the pattern area quality value is defied as the average of the quality values of the right and left slope areas.

Preferably, the above-described pattern area quality value is calculated based on the pattern area extracted by the pattern area extracting device 14. However, there are cases where the pattern area bases cannot be extracted because the lower region of the fingerprint is too small in the flat impression as in the case of FIG. 13. In such a case, the quality value may be calculated by using the left slope area (LSA) and the right slope area (RSA) without using the pattern area bases.

Figure 15:
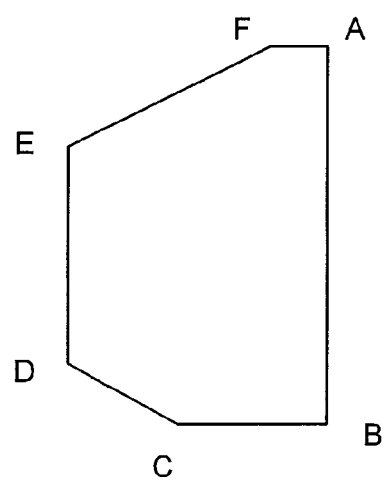
FIG. 15 is an illustration for showing an example of the shape of a pseudo-pattern area (left pattern area)

Further, depending on the shape of the pattern area slope, there are also cases where the dimension within the pattern area is small, and the collation accuracy cannot be guaranteed even if the ridgeline quality of the entire pixels within the pattern area is high. As a measure for such cases, when the pattern area dimension is smaller than a specific value (for example, 15000 pixels), a pseudo-shaped pattern area may be set to calculate the quality value based thereupon. The shape of the pseudo-pattern area is a hexagon that becomes narrower towards the outside as in the pseudo-pattern area shape (the left side) shown in FIG. 15. It is arranged in such a manner that the vertex A is aligned with the vertex of the pattern area slope and the side AB lies vertical. The vertex A may be aligned with the center point of the fingerprint such as the UCX center point. Shown herein is the case where it is aligned with the UCX center point. For the size, the side AB is set as about 155 pixels and the distance from the point E to the side AB as about 120 pixels. The shape of the pseudo-pattern area is a simulation of the shape that appears as the pattern area of many fingerprints, and the size thereof is so set that the dimension becomes the specific value of about 15000 pixels.

Figure 16:
FIG. 16 illustrates an example of a first pattern area quality calculation.

FIG. 16 shows the pattern area defined in this manner. In this case, the dimension of the right slope area (the part shown lightly) has 20800 pixels. Thus, this area is employed as the right slope area. However, the dimension of the left slope area (the part lightly shown) has 13400 pixels, which is smaller than the set value, 15000 pixels. Thus, the pseudo-pattern area is employed for that.

Figure 17:
FIG. 17 illustrates an example of a second pattern area quality calculation.

The use of this pseudo-pattern area is also effective as a relief measure for the case where the pattern area slope cannot be extracted even though the UCX center point is extracted, because it does not have a sufficient area on the right and left sides. The shape and size of the pseudo-pattern area in this case are also the same as those of the above-described case, and it is arranged in such a manner that the vertex A is aligned with the UCX center point and the side AB lies vertical. FIG. 17 shows the pseudo-pattern area of such case. In this example, the pixels shown in black are the pixels within the pattern area, showing the area with the low fingerprint ridgeline quality.

The case of FIG. 16 can be calculated as follows, since the pattern area is complete in both the right and left sides, and the ratio of the number of high-quality ridgeline pixels in the pattern area is 100% for both slope areas on the right and lefts sides.

$$cnfLPA=(100*30+100*70)/100=100$$

$$cnfRPA=(100*30+100*70)/100=100$$

Therefore, cnfPA that is the average thereof is also 100, which can be considered as a value capable of guaranteeing the result of collation.

Further, the case of FIG. 17 can be calculated as follows, since the pattern area is incomplete in both the right and left sides, and the ratio of the number of high-quality ridgeline pixels in the pattern area is 49% for the left slope area and 43% for the right slope area.

$$cnfLPA=(50*30+49*70)/100=49$$

$$cnfRPA=(50*30+43*70)/100=45$$

Therefore, cnfPA that is the average thereof becomes 47, which can be considered as a value capable of guaranteeing the result of collation to some extent.

Figure 18A:
FIG. 18A illustrates an example of a third pattern area quality calculation (in the case where the pattern area is incomplete)

Furthermore, the case of FIG. 18A can be calculated as follows, since there is no pattern area in both the right and left sides, and the ratio of the number of high-quality ridgeline pixels in the pattern area is 8% for both slope areas on the right and left sides.

$$cnfLPA=(0*30+8*70)/100=5$$

$$cnfRPA=(0*30+8*70)/100=5$$

Therefore, cnfPA that is the average thereof is also 5, which is an extremely small quality value. Thus, it is considered as a value that is difficult to guarantee the result of collation.

Figure 18B:
FIG. 18B illustrates an example of the third pattern area quality calculation (in the case where the pattern area is complete)

Moreover, the case of FIG. 18B can be calculated as follows, since the pattern area is complete in both the right and left sides, and the ratio of the number of high-quality ridgeline pixels in the pattern area is 100% for the left slope area and 96% for the right slope area.

$$cnfLPA=(100*30+100*70)/100=100$$

$$cnfRPA=(100*30+96*70)/100=94$$

Therefore, cnfPA that is the average thereof becomes 97, which can be considered as a value that is capable of guaranteeing the result of collation.

In the above, an example of the method for utilizing the result of quality judgment of one fingerprint and an example of the method for calculating the quality value thereof have been described. Next, described is a case in which the collation result can be guaranteed by using the result of simple calculation of quality values, when the quality values of a pair of pattern areas as the targets of collation are provided. Herein, the two pattern area quality values as the targets of collation are expressed by using (s) and (f) as in cnfPA(s) and cnfPA(f). For example, when the quality value product ((cnfPA(s)×cnfPA(f)/100), which is the product of the two quality values, is large, a high collation score can be expected if this pair of fingerprints is real mate. Inversely, when the collation score is small, it can be judged that this pair of fingerprints is real non-mate with high probability. The quality value product defined herein is obtained by normalizing the product of two quality values by a scale of 0-100, and it is considered to have high correlation between the collation accuracy since it expresses the expected common dimension of the two fingerprints.

Further, there is also considered an example of using the minimum values of the two quality values, min(cnfPA(s), cnfPA(f)). The data shown in FIG. 18A and FIG. 18B shows the case where the common area is narrow even though the fingerprints are the same, and it is difficult to guarantee the collation result. The quality value product of the pattern areas of the two fingerprints is 4 (=5×97/100), which is an extremely small value as expected.

It often happens that only the one of the right and left sides is impressed in a flat impression. One of the reasons for outputting the quality values separately for the right and left sides of the pattern area in this embodiment is because it is effective for guaranteeing the collation result in such cases. For example, when the quality value product of the left-side pattern area is large in the two fingerprints as the targets of collation, a wide common area can be guaranteed at least in the left-side pattern area. Thus, the correlation between the collation accuracy becomes high. That is, when the quality value product of the two regions of the pattern area, max((cnfLPA(s)×cnfLPA(f)/100), (cnfRPA(s)×cnfRPA(f)/100)), is large, the collation result can be guaranteed with high probability.

The quality value calculated by the quality judging device 15 is outputted to the outside via the fingerprint feature output device 18 and used by a user of the fingerprint collation apparatus 10 as the reliability of the result of the fingerprint collation.

(2.9) Fingerprint Collation and the Like

The fingerprint feature output device 18 outputs the feature data such as the minutiae of the ridgelines of the input fingerprint, like the conventional fingerprint recognition apparatus. Further, the fingerprint feature output device 18 additionally outputs the pattern area feature quantity of the input fingerprint, which is obtained by the pattern area extracting device 14.

For collating the input fingerprint with the fingerprint stored in the fingerprint database, the fingerprint collation device 19 performs collation of the pattern area feature quantities thereof, in addition to the collation performed on the minutia data of the ridgelines. The minutiae of the ridgelines used for the collation may be limited to those within the pattern areas. The calculation for the collation can be limited to the part that shows the characteristic of the individual well, so that efficient calculation can be achieved. Further, the ridgelines within the entire common area of the input image and the fingerprint image within the fingerprint database may be used as well. Naturally, the collation accuracy obtained thereby is improved. Furthermore, the fingerprint collation device 19 may use only the feature quantities of the pattern areas for collating the input fingerprint with the fingerprint stored in the fingerprint database.

(2.10) Effects of the Embodiment

In this embodiment, the minimum pattern areas are extracted. Thus, the quality of the fingerprint image containing the part effective for collation can be judged accurately. That is, it can be evaluated as a high-quality fingerprint even if it does not contain the areas other than the minimum necessary area.

In this embodiment, the pattern area is extracted based on the pattern area slopes. Therefore, the pattern area can be extracted as the minimum area that contains the characteristic part, i.e. the pattern area can be extracted properly.

In this embodiment, the pattern area can be extracted more properly by using the pattern area bases in addition to the pattern area slopes.

In this embodiment, the pattern area is extracted based on the UCX center point. Therefore, it can be applied to the fingerprints of various patterns.

In this embodiment, the pattern area is extracted from the fingerprint image of a hand or foot, and the quality of the fingerprint is judged by using the completeness evaluation value of the pattern area and the fingerprint ridge quality within the pattern area. This enables the judgment of the quality that is directly related to collation of the fingerprint based on the ridgelines of the fingerprint. Therefore, the accuracy of judging the fingerprint quality can be improved.

In this embodiment, the pattern area is extracted by being divided into a plurality of regions. Therefore, even when the pattern area is extracted partially, the condition can be reflected closely upon the completeness evaluation value. As a result, it is possible to perform the quality evaluation with high accuracy based on that value.

Furthermore, in addition to collation of the fingerprint based on the minutiae of the ridgelines of the fingerprint, it also becomes possible to perform collation by using the data that shows the characteristics of the pattern area such as the vertex coordinates and slope shape of the pattern area, i.e. the feature quantities of the pattern area. Therefore, improvements in the collation accuracy can be expected. In addition, it becomes possible to perform collation by using the feature quantities of the pattern area, instead of collation of the fingerprint by using the minutiae of the ridgelines.

2. Second Embodiment

Next, there will be described an embodiment of a pattern area extraction method that does not depend on the UCX center point. First, pattern area slopes are searched by every specific number of pixels from the upper part of the fingerprint towards the lower part. Based on the changes in the shape, the pattern area slopes are extracted. Then, the pattern area is extracted based on the extracted pattern slopes.

Figure 19:
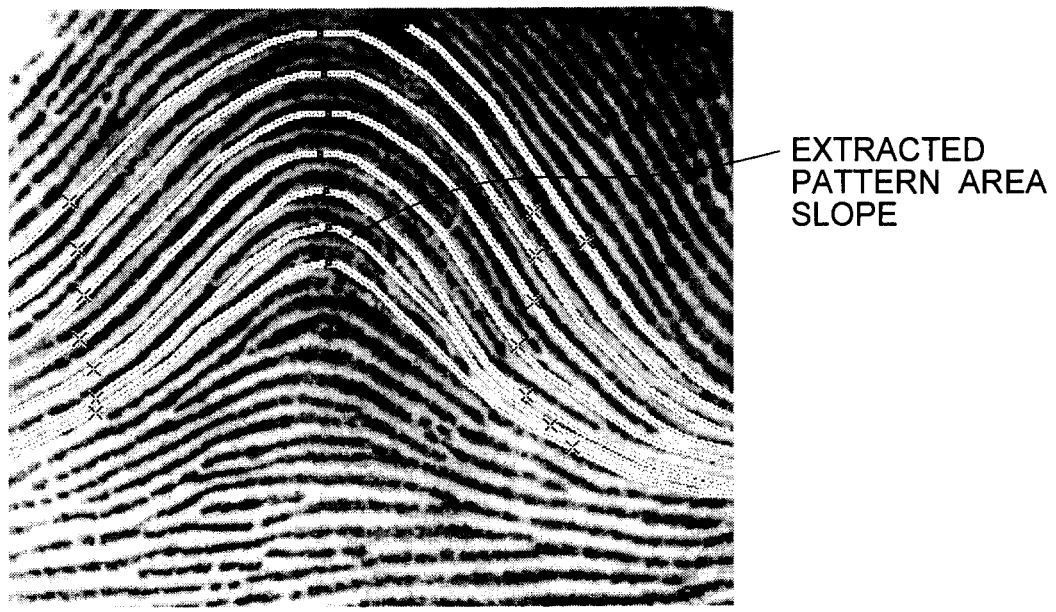
FIG. 19 illustrates an example of extracting a pattern area slope from a fingerprint image (Arch) according to a second embodiment.

In the arch type shown in FIG. 19, for the distance in the vertical direction between the lower parts (slope feet) of the pattern area slopes, it is almost the same as the distance between the slope vertexes in the upper part of the pattern area, whereas it becomes sharply smaller compared to the distance between the slope vertexes in the inner part of the pattern area. Extraction of the pattern area slopes in this embodiment utilizes this characteristic. That is, the distance between the pattern area feet of the ridgelines adjacent to each other is searched from the upper part of the fingerprint. Then, the first pattern area slope whose distance between the pattern area foot of the next slope becomes smaller than a prescribed proportion or more compared to the distance between the slope vertexes is specified, and the pattern area slope that is right before the specified slope is extracted.

Figure 20:
FIG. 20 illustrates an example of extracting a pattern area slope from a fingerprint image (Loop) according to the second embodiment.

Further, in a fingerprint of loop type or whorl type with a delta as shown in FIG. 20, the pattern area slope to be extracted is the lowest fingerprint ridge that lies on the outer side of the delta. That is, the fingerprint ridge positioned lower than the pattern area slope runs towards the inner side of the delta, i.e. curves towards the inner side. Therefore, when the first fingerprint ridge that curves back towards the inner side (this fingerprint ridge is also referred to as the pattern area slope hereinafter) can be specified by checking the fingerprint ridges in order from the upper side of the fingerprint, the fingerprint ridge that is right before that specified fingerprint ridge can be specified as the pattern area slope to be extracted.

The pattern area slope extraction processing according to the second embodiment extracts the pattern area slopes on both the right and left sides from the same start point. The order of the processing will be described hereinafter.

S101) In the area where almost the horizontal direction (for example, the inclination from the horizontal direction is ¼ radian or less) is defined, an appropriate point on the fingerprint center part (for example, a pixel that is close to the center of the image in the X-axis direction and at the highest position in the Y-axis direction) is set as the initial value for the start point of tracing.

S102) The direction data of the set start point is checked. When the direction of that point is defined and that direction is considered almost being the vertical direction (for example, the inclination from the horizontal direction is ⅜ radian or more), it can be judged as being the lower part of the pattern area slope. Thus, the pattern area slope extraction processing is ended and it is shifted to step S106. Otherwise, it is shifted to a next step S103. The directions of each point in the vicinity of the pattern area slope vertexes are almost horizontal in the upper part of the pattern area, whereas the direction becomes close to vertical when reaching to the inner side of the pattern area in the lower part of the pattern area slope. Thus, the pattern area slope extraction processing may be ended. When the direction is unknown, the processing is ended, outputting that the pattern area slope cannot be extracted.

S103) Tracing in the pixel direction from the set start point is started. This tracing is performed respectively in both the right and left directions.

S104) If the following ending conditions are satisfied when checking the coordinates of the trace extension pixel, the tracing is ended.

Ending condition 1: When the horizontal distance (difference in X-coordinate) between the extension pixel and the start point exceeds a specific value (for example, 200 pixels).

Ending condition 2: When the ridgeline direction of the extension pixel is undefined (unknown).

Ending condition 3: When the extension pixel reaches the border of the image area.

Ending condition 4: When the X-coordinate of the extension pixel comes on the inner side of the X-coordinate of the already-reached pixel.

S105) From the locus obtained by the tracing performed twice on the right and left sides, the pixel at the highest point (the largest point on the Y-coordinate) is selected as the vertex of the slope line (the slope vertex). If there are a plurality of continuous highest points (that is, a row of the highest points forms a horizontal line), the pixel closest to the center of the X-coordinate is selected from those highest points to be the slope vertex. The points on the slope line counted for about 180 pixels from the slope vertex in both the right and left sides are marked as the slope foot points. Tracing is performed from those points in the upper direction (positive direction of Y-axis), and the distance (Y-direction distance) to the points where the trace lines intersect with the previous slope line is extracted. These are defined as the slope foot distances of the right and left sides.

S106) The followings are checked in order to judge whether or not there is a possibility that the slope line extracted by the previous tracing is the pattern area slope to be extracted.

Judging condition 1: When the slope line of either the right or left side ends according to the ending condition 4 in this occasion for the first time.

Judging condition 2: When the slope foot distance of either the right or left side becomes ⅓ or less than the Y-axis direction distance between the slope vertexes.

Judging condition 3: When the slope line of this time cannot be defined.

When one of the above-described judging conditions is satisfied, it is advanced to a next step S107. Otherwise, it is shifted to step S109.

S107) The followings are checked in order to judge whether or not the slope line extracted by the previous tracing can be considered as the pattern area slope to be extracted.

Judging condition 4: It is judged by a combination of the horizontal distance (difference in X-coordinate) between the end pixel (the last extension pixel) and the start point and the curving degree of the pattern slope curve in the vicinity of the end. Specifically, it is determined as the pattern area slope when the horizontal distance between the end pixel and the start point is more than 80 pixels and the trace line in the vicinity of the end is a concave facing downwards to the left. This judgment of concave in this embodiment is performed based on the difference in the directions of pixel A that is traced back by 25 pixels from the end pixel E and pixel B traced back by 50 pixels from the end pixel E. That is, the direction EA and the direction EB are compared. If the direction EA is closer to vertical than the direction EB is, it is determined as the concave facing downwards to the left. The detailed description thereof will be omitted since it is the same as the pattern area judging condition 2 (step S45) of the first embodiment. When either one of the slope lines on the right or left side satisfies this condition, both sides are determined as the pattern area slopes to be extracted.

Judging condition 5: It is considered unjudgeable when the slope does not meet the above-described conditions.

S108) When judged that the slope lines extracted previously are the pattern area slopes to be extracted, those lines are outputted as the pattern area slopes on the right and left sides, and the processing is ended. When judged as unjudgeable, it is determined that the pattern area slope cannot be extracted, and the processing is ended.

S109) A pixel beneath the previous start point (for example, the pixel that is 10 pixels therefrom in the lower direction) is set as the next start point, and the processing is returned to step S102. When then next start point reaches the boundary of the image area, the processing is ended considering that the pattern area slopes cannot be extracted.

Next, the appropriateness of this extraction processing will be described by referring to FIG. 19 and FIG. 20. FIG. 19 shows the process of the pattern area slope extraction processing performed on an arch fingerprint. In this case, the slope lines are extracted at the interval of 20 pixels so that it can be easily recognized. There are eight slope line candidates shown therein. When the slope lines are numbered from the top, the seventh slope line is the pattern area slope candidate to be extracted. The reason for this is that the Y-direction distance from the right slope foot point of the eighth slope line to the seventh slope line is 4 pixels, which is less than ⅓ of the Y-direction distance between the slope vertexes (20 pixels), thereby satisfying the judging condition 2. This candidate also satisfies the judging condition 4 of step S107), so that it is determined as the pattern area slope to be extracted.

FIG. 20 shows the process of the pattern area slope extraction processing performed on a loop fingerprint. In this case, the third slope line is the candidate of the pattern area slope to be extracted. The reason for this is that the fourth line satisfies the ending condition 4 for the first time. This candidate also satisfies the judging condition 4 of step S107), so that it is determined as the pattern area slope to be extracted.

After extracting the pattern slopes in this manner described above, the pattern area is extracted in the same manner as that of the first embodiment. Further, the pattern area feature quantity is outputted.

This embodiment does not depend on the UCX center point. Therefore, it has such an advantage that the pattern area can be extracted even from a fingerprint image whose UCX center point area is unclear.

Furthermore, even though the pattern area bases cannot be extracted, this embodiment can provide the same effects as those of the first embodiment, except for that.

With the present invention, it becomes possible to extract a specific area including the characteristic part of the inherent pattern of individual fingerprint from an inputted fingerprint image of a human being or other creature.

What is claimed is:

1. A fingerprint pattern area extraction apparatus, comprising an extracting unit for extracting a pattern area from an inputted fingerprint image,
   wherein the extracting unit includes a pattern area slope extracting device which has a right pattern area slope extracting device and a left pattern area slope extracting device;
   wherein the right pattern area slope extracting device extracts a first right pattern slope by searching right pattern area slopes towards an upper direction from a center point of the fingerprint image; and
   wherein the left pattern area slope extracting device extracts a first left pattern slope by searching left pattern area slopes towards the upper direction from the center point of the fingerprint image; and
   wherein the fingerprint pattern area extraction apparatus further comprises a pattern area feature extracting device that:
   calculates a right slope area dimension and a left slope area dimension based on the right and left pattern area slopes;
   calculates dimensions of the pattern area that include a total value thereof; and
   outputs, based on a result of the calculations, a completeness evaluation value of the extracted pattern area based on whether or not the first right pattern slope is extracted and whether or not the first left pattern slope is extracted.

2. The fingerprint pattern area extraction apparatus as claimed in claim 1, wherein the pattern area feature extracting device further outputs a right slope vertex position, a left slope vertex position, a distance between the vertexes of the right and left slopes, height of the right slope vertex, height of the left slope vertex, and angles of the right and left slopes, of the pattern area.

3. A non-transitory computer readable recording medium storing a program for enabling a computer that configures a fingerprint pattern area extraction device to execute functions comprising:

extracting a first right pattern slope by searching right pattern area slopes towards an upper direction from a center point of the fingerprint image;

extracting a first left pattern slope by searching left pattern area slopes towards the upper direction from the center point of the fingerprint image;

calculating a right slope area dimension and a left slope area dimension based on the right and left pattern area slopes;

calculating dimensions of the pattern area that include a total value thereof; and outputting, based on a result of the calculations, a completeness evaluation value of the extracted pattern area based on whether or not the first right pattern slope is extracted and whether or not the first left pattern slope is extracted.

4. The non-transitory computer readable recording medium storing the program as claimed in claim 3, wherein the program enables the computer to further execute a function comprising:

outputting a right slope vertex position, a left slope vertex position, a distance between the vertexes of the right and left slopes, height of the right slope vertex, height of the left slope vertex, and angles of the right and left slopes, of the pattern area.

5. A fingerprint pattern area extraction method comprising:

extracting a first right pattern slope by searching right pattern area slopes towards an upper direction from a center point of an inputted fingerprint image;

extracting a first left pattern slope by searching left pattern area slopes towards the upper direction from the center point of the fingerprint image;

calculating a right slope area dimension and a left slope area dimension based on the right and left pattern area slopes;

calculating dimensions of the pattern area that include a total value thereof; and outputting, based on a result of the calculations, a completeness evaluation value of the extracted pattern based on whether or not the first right pattern slope is extracted and whether or not the first left pattern slope is extracted.

6. The fingerprint pattern area extraction method as claimed in claim 5, further comprising outputting a right slope vertex position, a left slope vertex position, a distance between the vertexes of right and left slopes, a height of the right slope vertex, a height of the left slope vertex, and angles of the right and left slopes, of the pattern area.

* * * * *